United States Patent
Mizuhara

(10) Patent No.: US 6,993,036 B2
(45) Date of Patent: Jan. 31, 2006

(54) ATM EXCHANGE AND METHOD OF OPERATING THE SAME

(75) Inventor: Bun Mizuhara, Tokyo (JP)

(73) Assignee: NEC Corporation, Tokyo (JP)

( * ) Notice: Subject to any disclaimer, the term of this patent is extended or adjusted under 35 U.S.C. 154(b) by 845 days.

(21) Appl. No.: 09/768,279

(22) Filed: Jan. 25, 2001

(65) Prior Publication Data

US 2001/0009550 A1 Jul. 26, 2001

(30) Foreign Application Priority Data

Jan. 26, 2000 (JP) .............................. 2000-017587

(51) Int. Cl.
*H04L 12/28* (2006.01)
(52) U.S. Cl. .................................. 370/401; 370/395.5
(58) Field of Classification Search ................ 370/351, 370/389, 395.1–399, 401–405
See application file for complete search history.

(56) References Cited

U.S. PATENT DOCUMENTS

| | | | |
|---|---|---|---|
| 6,016,319 A * | 1/2000 | Kshirsagar et al. | 370/410 |
| 6,111,880 A * | 8/2000 | Rusu et al. | 370/395.53 |
| 6,188,689 B1 * | 2/2001 | Katsube et al. | 370/389 |
| 6,711,167 B1 * | 3/2004 | Ikeda et al. | 370/395.1 |
| 2003/0123448 A1 * | 7/2003 | Chang | 370/395.1 |

FOREIGN PATENT DOCUMENTS

| | | |
|---|---|---|
| JP | 7-74782 | 3/1995 |
| JP | 7-264207 | 10/1995 |
| JP | 8-79294 | 3/1996 |
| JP | A 10-271133 | 10/1998 |
| JP | 10-303965 | 11/1998 |
| JP | 2891146 | 2/1999 |
| JP | 11-215156 | 8/1999 |
| JP | A 11-252108 | 9/1999 |
| JP | 11-289345 | 10/1999 |

* cited by examiner

*Primary Examiner*—Huy D. Vu
*Assistant Examiner*—Jason Mattis
(74) *Attorney, Agent, or Firm*—Young & Thompson

(57) ABSTRACT

An asynchronous transfer mode (ATM) exchange includes an ATM switch (120), an ATM line card (110), a server card (130), and an Ethernet line card (140). The server card (130) converts an ATM cell including connection data, into a network layer packet, extracts a network layer next hop out of the network layer packet, converts the network layer next hop into associated connection data, and converts the network layer packet and connection data into an ATM cell. The Ethernet line card (140) converts the ATM cell into a network layer packet, extracts the connection data out of the ATM cell, converts the connection data into a shared medium address, and converts the network layer packet and shared medium address into a shared medium frame.

18 Claims, 17 Drawing Sheets

FIG. 10

| IP ADDRESS OF RECEIVER | IP NEXT HOP |
|---|---|
| IP ADDRESS OF FIRST ATM TERMINAL 201 | IP ADDRESS OF FIRST ATM TERMINAL 201 |
| IP ADDRESS OF SECOND ATM TERMINAL 212 | IP ADDRESS OF ATM ROUTER 211 |
| IP ADDRESS OF ETHERNET TERMINAL 301 | IP ADDRESS OF ETHERNET TERMINAL 301 |
| IP ADDRESS OF ETHERNET TERMINAL 312 | IP ADDRESS OF ETHERNET ROUTER 311 |

| IP ADDRESS OF RECEIVER | CONNECTION DATA |
|---|---|
| IP ADDRESS OF FIRST ATM TERMINAL 201 | 42a |
| IP ADDRESS OF ATM ROUTER 211 | 42b |
| IP ADDRESS OF ETHERNET TERMINAL 301 | 42c |
| IP ADDRESS OF ETHERNET ROUTER 311 | 42d |

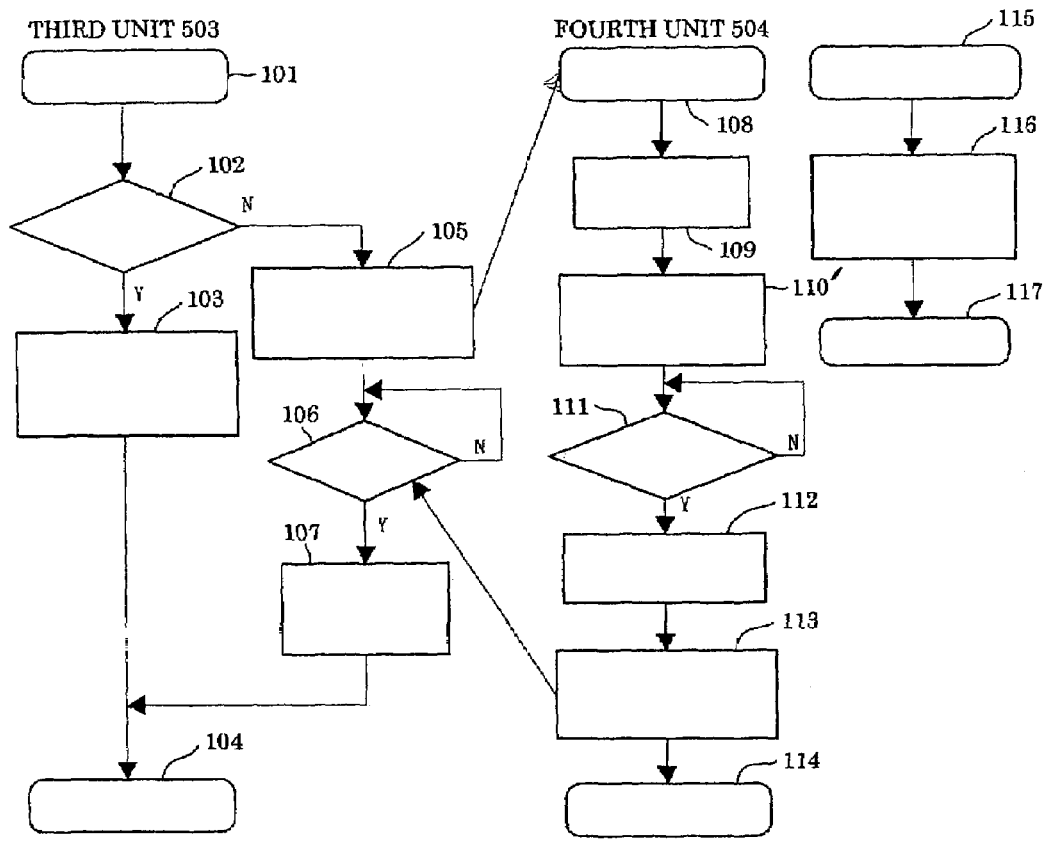

101: RECEIVING IP PACKET 32x
102: IS CONNECTION DATA INCLUDED?
103: FINDING CONNECTION DATA 42x
104: TRANSMITTING CONNECTION DATA 42x
105: TRANXMITTING ATM ARP PACKET
106: IS RESPONSE RECEIVED?
107: STORING RELATION
108: RECEIVING ATM ARP PACKET
109: ASSIGNING NON-USED CONNECTION DATA 42x
110': TRANSMITTING ARP PACKET
111: IS RESPONSE RECEIVED?
112: EXTRACTING MAC ADDRESS 43x
113: STORING RELATION
114: TRANSMITTING MAC ADDRESS 43x
115: RECEIVING CONNECTION DATA 42x
116: FINDING MAC ADDRESS 43x
117: TRANSMITTING MAC ADDRESS 43x

201 : RECEIVING IP PACKET 32y
202 : PRODUCING CONNECTION
       DATA 42y
203 : TRANSMITTING CONNECTION
       DATA 42y
204 : RECEIVING CONNECTION
       DATA 42y
205 : IS CONNECTION DATA
       REGISTERED ?
206 : FINDING MAC ADDRESS 43y
207 : TRANSMITTING MAC ADDRESS 43y

208 : DEFINING IP NEXT HOP 41y
209 : TRANSMITTING ARP PACKET
210' : IS RESPONSE RECEIVED ?
211' : EXTRACTING MAC ADDRESS 43y
212' : STORING RELATION

ATM EXCHANGE AND METHOD OF OPERATING THE SAME

BACKGROUND OF THE INVENTION

1. Field of the Invention

The invention relates to an asynchronous transfer mode (ATM) exchange and a method of operating the same.

2. Description of the Related Art

An asynchronous transfer mode (ATM) exchange is generally designed to include a server card and an Ethernet line card.

FIG. 1 is a block diagram of a server card 630 in a conventional ATM exchange, and FIG. 2 is a block diagram of an Ethernet line card 640 in a conventional ATM exchange. FIG. 3 illustrates a frame format used in communication between the server card 630 and the Ethernet line card 640.

As illustrated in FIG. 1, the server card 630 is comprised of a first reassembly unit 601, a second unit 602 for retrieving a routing table, a third unit 603 for producing connection data, a fourth unit 604 for producing a MAC address, and a fifth unit 605 for carrying out segmentation.

The first reassembly unit 601 receives an ATM cell 11, converts the thus received ATM cell 11 into an IP packet 32, and transmits the thus converted IP packet 32 to the second unit 602. The second unit 602 receives the IP packet 32 from the first unit 601, and extracts an IP next hop 41 out of the IP packet 32. The thus extracted IP packet 32 is transmitted to both the third unit 603 and the fourth unit 604, and the IP packet 32 received by the second unit 602 is transmitted to the fifth unit 605.

The third unit 603 converts the thus received IP next hop 41 into connection data 42, and the fourth unit 604 converts the thus received IP next hop 41 into a MAC (Media Access Control) address 43. The thus produced connection data 42 and MAC address 43 are transmitted to the fifth unit 605. The fifth unit 605 converts the IP packet 32 into an output ATM cell 11*a*, based on the connection data 42 and the MAC address 43.

As illustrated in FIG. 2, the Ethernet line card 640 is comprised of a second reassembly unit 606 and a sixth unit 607 for producing an Ethernet frame.

The second reassembly unit 606 receives an ATM cell 11, and converts the ATM cell into an IP packet 32. The sixth unit 607 receives the IP packet 32 from the second reassembly unit 606, and converts the IP packet 32 into an Ethernet frame 34.

The server card 630 and the Ethernet line card 640 make communication with each other through a frame format illustrated in FIG. 3, for instance.

However, the above-mentioned conventional ATM exchange is accompanied with a problem that an extremely high load is exerted on the server card 630, because the server card 630 has to convert the IP next hop 41 into both the connection data 42 and the MAC address 43.

In addition, since the frame format illustrated in FIG. 3, used for making communication between the server card 630 and the Ethernet line card 640 has a different structure from a structure of a frame format used for transmitting an IP packet on ATM, the server card 630 has to operate in different ways in dependence on whether an output therefrom is to be transmitted through ATM or through Ethernet.

Japanese Unexamined Patent Publication No. 11-215156 has suggested a connector for connecting communication networks to each other among ATM and non-ATM networks. The connector includes a first network connector for connecting a first non-ATM network to an ATM network, and a second network connector for connecting the ATM network to a second non-ATM network. When data is to be transmitted from a first terminal connected to the first non-ATM network to a second terminal connected to the second non-ATM network through the ATM network, data is transmitted based on MAC (Media Access Control) address of the second terminal, after communication link has been established between the first and second network connectors.

Japanese Unexamined Patent Publication No. 11-289345 has suggested a router for determining a route through which data is transmitted when networks are connected to each other. The router is comprised of a routing table, a cache table, and a cache management table. The routing table stores a network address as an IP address indicative of an address of a network to which data is to be transmitted, a next hop address as an IP address of a router to which data is to be transmitted, and a transmission interface number. The cache table stores data about a link layer (MAC header) as an IP address of an address of a host, and a transmission interface number. A routing entry number is assigned to each entry in the routing table, and a cache entry number is assigned to each entry in the cache table. The cache management table stores data indicative of a relation between the routing entry number and the cache entry number.

Japanese Patent No. 2891146 (Japanese Unexamined Patent Publication No. 9-116560) has suggested a network server which accomplishes virtual LAN including existing LAN terminals on ATM network regardless of locations of the LAN terminals. The network server includes a LAN terminator which terminates a protocol of a MAC sub-layer in an existing LAN, an ATM terminator which terminates protocols of AAL and ATM, and a data transmitter which transmits data to a terminator associated with a MAC address identified based on data received in any one of the terminators, an identifier checker which identifies an Ether type of data received in any one of the terminators, and means for, when the data is transmitted to an ATM terminator, determining ATM connection through which data is to be transmitted, based on a MAC address, an IP sub-net address, and the Ether type, and notifying the ATM connection to the ATM terminator.

Japanese Unexamined Patent Publication No. 10-303965 has suggested a router including RFC 1577 "Classical IP and ARP over ATM", having a virtual interface, and operating in ATM-LAN atmosphere. The router includes an address table. An entry comprised of an address in a network layer, an address of a next hop on a patch through which a packet is transmitted, and data about packet transmission can be registered into the address table, retrieved in the address table, or deleted from the address table. The address in a network layer and the address of a next hop are registered as data about packet transmission when a packet is to be transmitted. A header in a data link layer and an interface to which data is to be transmitted are registered as data about packet transmission when data is to be transmitted to a LAN interface. Data about calls in ATM is registered as data about packet transmission when data is to be transmitted to an ATM interface. Data is transmitted directly to a physical interface without carrying out a routing step, by using the address table in which packets having been received from the interfaces are registered.

Japanese Unexamined Patent Publication No. 8-79294 has suggested a an apparatus of connecting LAN terminals to each other or connecting a LAN terminal to an ATM terminal through an ATM network. The apparatus includes a protocol converter between an ATM network and each of LANs.

Japanese Unexamined Patent Publication No. 7-264207 has suggested a method of connecting a terminal to an ATM network. In the method, an ATM adapter, which interactively converts a data field and an address field in a packet transmitted between terminals in non-ATM LAN to a data field and a header in an ATM cell transmitted in an ATM network having at least one an ATM exchange, is arranged either in the data terminals or between the data terminal and the ATM exchange. The data terminal in a non-ATM LAN is connected to the ATM network through the ATM adapter.

Japanese Unexamined Patent Publication No. 7-74782, which is based on the U.S. application Ser. No. 058157 filed by Ken Marshal on May 5, 1993, has suggested an apparatus for transmitting data from non-ATM terminal to an ATM terminal. The apparatus is comprised of a non-ATM communication interface which is connected to the non-ATM terminal and which receives non-ATM communication data packet from the non-ATM terminal, segmentation means connected to the non-ATM communication interface for dividing the non-ATM communication data packet into ATM cells after the non-ATM communication interface has received the non-ATM communication data packet, and an ATM interface connected to both the ATM terminal and the segmentation means for transmitting the ATM cell through the ATM terminal in response to the segmentation means.

However, the above-mentioned problems remain unsolved even in the above-mentioned Publications.

SUMMARY OF THE INVENTION

In view of the above-mentioned problems in the conventional ATM exchange, it is an object of the present invention to provide an ATM exchange which makes it possible to carry out the same steps regardless of whether an output is to be transmitted through ATM or through Ethernet.

In one aspect of the present invention, there is provided an asynchronous transfer mode (ATM) exchange, including (a) a next hop information adder, and (b) a shared medium frame generator. The next hop information adder includes (a1) a first unit which converts an ATM cell including connection data, into a network layer packet, (a2) a second unit which extracts a network layer next hop out of the network layer packet, (a3) a third unit which converts the network layer next hop into associated connection data, and (a4) a fourth unit which receives the network layer packet from the second unit and the connection data from the third unit, and converts the thus received network layer packet and connection data into an ATM cell. The shared medium frame generator includes (b1) a fifth unit which converts the ATM cell into a network layer packet and extracts the connection data out of the ATM cell, (b2) a sixth unit which receives the connection data from the fifth unit and converts the thus received connection data into a shared medium address, and (b3) a seventh unit which receives the network layer packet from the fifth unit and the shared medium address from the sixth unit, and converts the thus received network layer packet and shared medium address into a shared medium frame.

In accordance with the ATM exchange, since the network layer next hop is converted into the shared medium address through the connection data, it is no longer necessary to carry out different steps in dependence on whether an output is transmitted through an ATM line or a shared medium line.

In addition, since the network layer next hop is extracted in the next hop information adder, and the shared medium address is produced in the shared medium frame generator, that is, since the network layer next hop and the shared medium address are produced in separate units, a load can be distributed into those units. It is possible to prevent a load from being concentrated to the next hop information adder or server card.

It is preferable that a relation between the network layer next hop and the connection data is defined by address resolution protocol (ARP), and that a relation between the connection data and the shared medium address is defined by address resolution protocol (ARP).

This enhances flexibility in reconstruction of a network, for instance, when the number of terminals in the network is to be increased.

It is preferable that the third unit converts the network layer next hop the associated connection data in accordance with a predetermined rule.

This results in reduction in communication and steps to be carried out, ensuring reduction in a load to be exerted on the ATM exchange.

It is preferable that a communication between the third unit and the sixth unit is made through an internal connection identifier.

This results in reduction in steps to be carried out, ensuring reduction in a load to be exerted on the ATM exchange.

There is further provided an asynchronous transfer mode (ATM) exchange including (a) an asynchronous transfer mode (ATM) switch, (b) a server card receiving an ATM cell including connection data, from the asynchronous transfer (ATM) mode, (c) an Ethernet line card receiving an ATM cell including connection data, from the asynchronous transfer (ATM) mode, and connecting to an Ethernet terminal directly or through an Ethernet router, and (d) an asynchronous transfer mode line card receiving an ATM cell from the asynchronous transfer (ATM) mode, and connecting to an asynchronous transfer mode terminal directly or through an asynchronous transfer mode router, the server card including (b1) a first unit which converts the ATM cell into a network layer packet, (b2) a second unit which extracts a network layer next hop out of the network layer packet, (b3) a third unit which converts the network layer next hop into associated connection data, and (b4) a fourth unit which receives the network layer packet from the second unit and the connection data from the third unit, and converts the thus received network layer packet and connection data into an ATM cell, the Ethernet line card including (c1) a fifth unit which converts the ATM cell into a network layer packet and extracts the connection data out of the ATM cell, (c2) a sixth unit which receives the connection data from the fifth unit and converts the thus received connection data into a shared medium address, and (c3) a seventh unit which receives the network layer packet from the fifth unit and the shared medium address from the sixth unit, and converts the thus received network layer packet and shared medium address into a shared medium frame.

In another aspect of the present invention, there is provided a method of operating an asynchronous transfer mode (ATM) exchange, including the steps of (a) converting an ATM cell including connection data, into a network layer packet, (b) extracting a network layer next hop out of the network layer packet, (c) converting the network layer next hop into associated connection data, (d) converting the network layer packet and the associated connection data into an ATM cell, (e) converting an ATM cell into a network layer packet, (f) extracting connection data out of the ATM cell, (g) converting the connection data into a shared medium address, and (h) converting the network layer packet and the shared medium address into a shared medium frame, the steps (a) to (d) being to be carried out independently of the steps (e) to (h).

It is preferable that the steps (e) and (f) are concurrently carried out.

The method may further include the step of identifying a relation between the network layer next hop and the connection data by address resolution protocol (ARP).

The method may further include the step of identifying a relation between the connection data and the shared medium address by address resolution protocol (ARP).

It is preferable that the step (c) is carried out in accordance with a predetermined rule.

In still another aspect of the present invention, there is provided a recording medium readable by a computer, storing a program therein for causing a computer to act as the above-mentioned asynchronous transfer mode (ATM) exchange.

There is further provided a recording medium readable by a computer, storing a program therein for causing a computer to carry out the above-mentioned method of operating an asynchronous transfer mode (ATM) exchange.

The advantages obtained by the aforementioned present invention will be described hereinbelow.

The first advantage is that since a network layer packet is converted into the shared medium address through the network layer next hop and the connection data, it is no longer necessary to carry out different steps in dependence on whether an output is transmitted to an ATM terminal or a shared medium terminal.

The second advantage is that since the network layer next hop is extracted in the next hop information adder, and the shared medium address is produced in the shared medium frame generator, that is, since the network layer next hop and the shared medium address are produced in separate units, a load can be distributed into those units. It is possible to prevent a load from being concentrated to the next hop information adder or server card.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 10 illustrates a routing table used in the first embodiment.

FIG. 11 illustrates a table in accordance with which an IP next hop is converted into connection data in the first embodiment.

FIG. 14 is a flow chart showing steps to be carried out in the ATM exchange in accordance with the second embodiment.

DESCRIPTION OF THE PREFERRED EMBODIMENTS

Preferred embodiments in accordance with the present invention will be explained hereinbelow with reference to drawings.

[First Embodiment]

Figure 1:
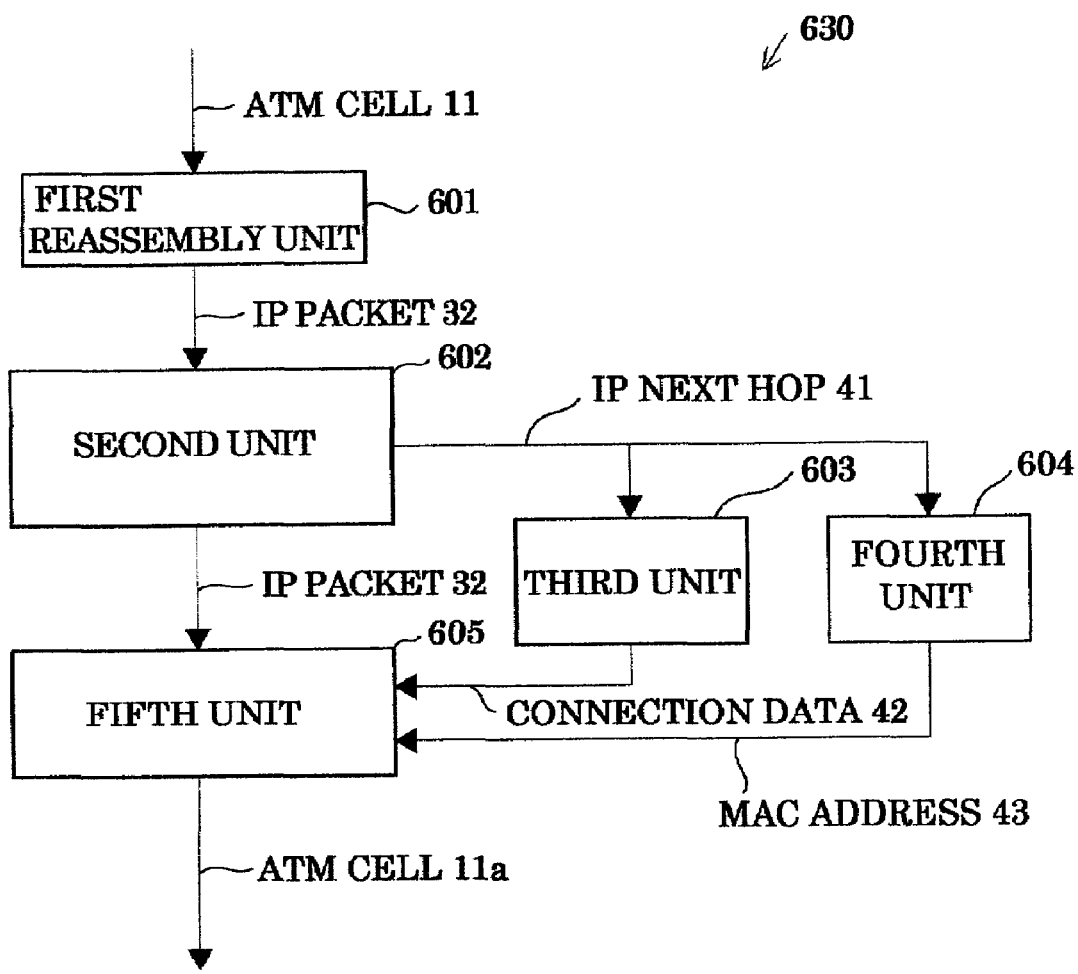
FIG. 1 is a block diagram of a server card in a conventional ATM exchange.
Figure 2:
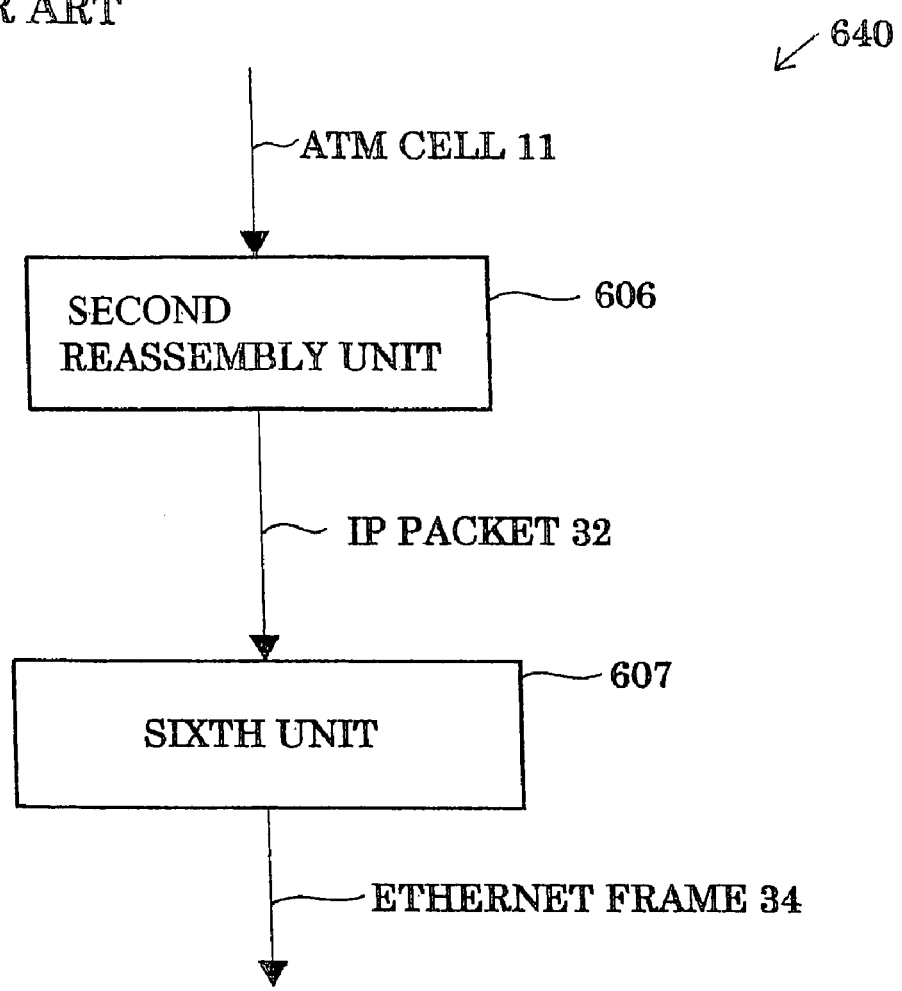
FIG. 2 is a block diagram of an Ethernet line card in a conventional ATM exchange.
Figure 3:
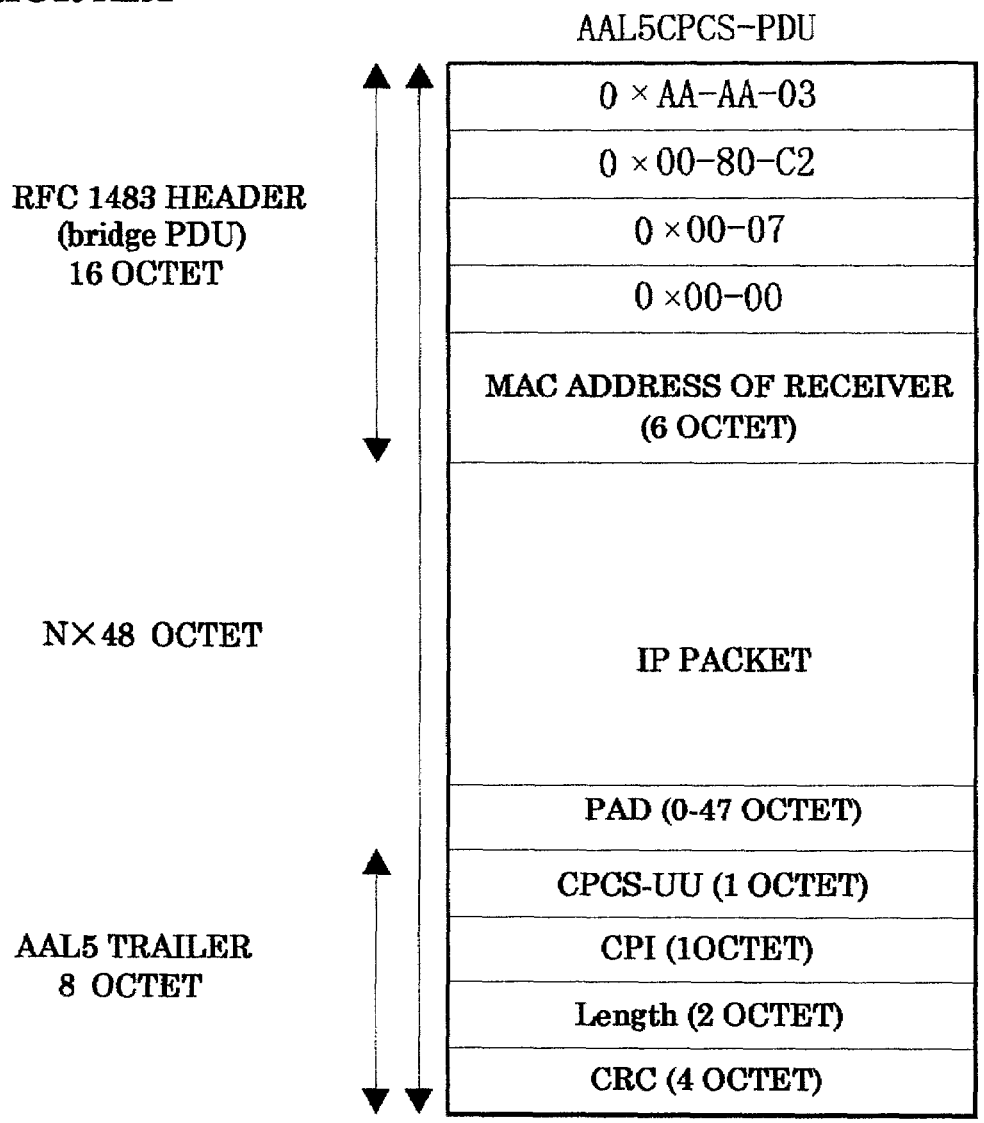
FIG. 3 illustrates a frame format used in a conventional ATM exchange.
Figure 4:
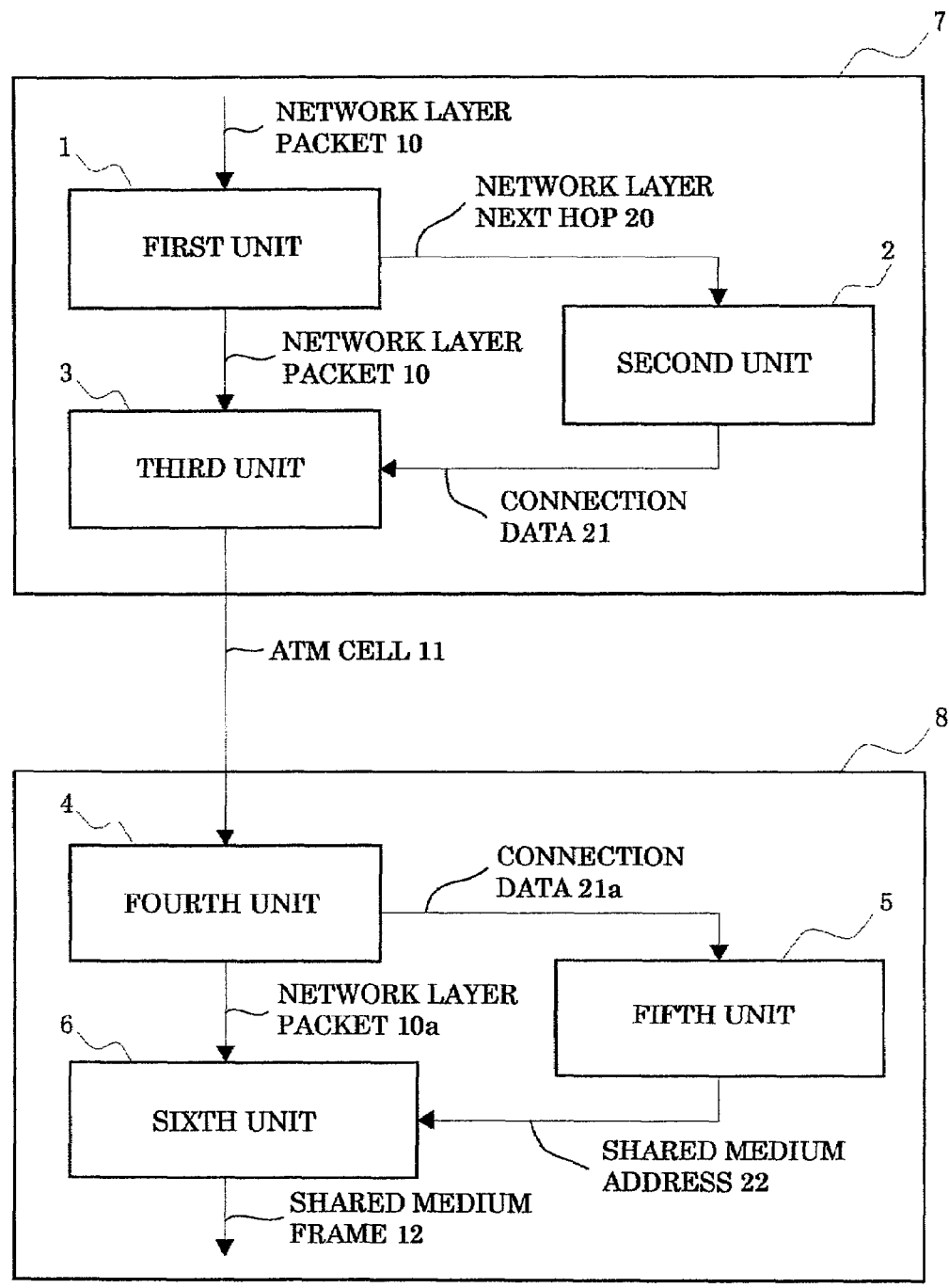
FIG. 4 is a functional block diagram of the ATM exchange in accordance with the first embodiment.

FIG. 4 illustrates a structure of an ATM exchange in accordance with the first embodiment.

The ATM exchange includes a next hop information adder 7 and a shared medium frame generator 8.

The next hop information adder 7 is comprised of a first unit 1, a second unit 2, and a third unit 3. The shared medium frame generator 8 is comprised of a fourth unit 4, a fifth unit 5, and a sixth unit 6.

In operation, the first unit 1 receives a network layer packet 10 externally of the ATM exchange. The first unit 1 extracts a network layer next hop 20 out of the network layer packet 10, and transmits the thus extracted network layer next hop 20 to the second unit 2 and the network layer packet 10 to the third unit 3.

The second unit 2 converts the network layer next hop 20 into connection data 21, and transmits the thus converted connection data 21 to the third unit 3.

The third unit 3 receives the network layer packet 10 from the first unit 1 and the connection data 21 from the second unit 2, and converts the network layer packet 10 into an ATM cell 11, based on the connection data 21. The thus produced ATM cell 11 is transmitted to the shared medium frame generator 8.

The fourth unit 4 in the shared medium frame generator 8 receives the ATM cell 11 from the third unit 3. The fourth unit 4 converts the received ATM cell 11 into a network layer packet 10a, and at the same time, extracts connection data 21a out of the ATM cell 11.

The fifth unit 5 receives the connection data 21a from the fourth unit 4, and converts the connection data 21a into a shared medium address 22, and transmits the thus converted shared medium address to the sixth unit 6.

The sixth unit 6 receives the network layer packet 10a from the fourth unit 4 and the shared medium address 22 from the fifth unit 5, and converts the network layer packet 10a into a shared medium frame 12, based on the shared medium address 22.

Figure 5:
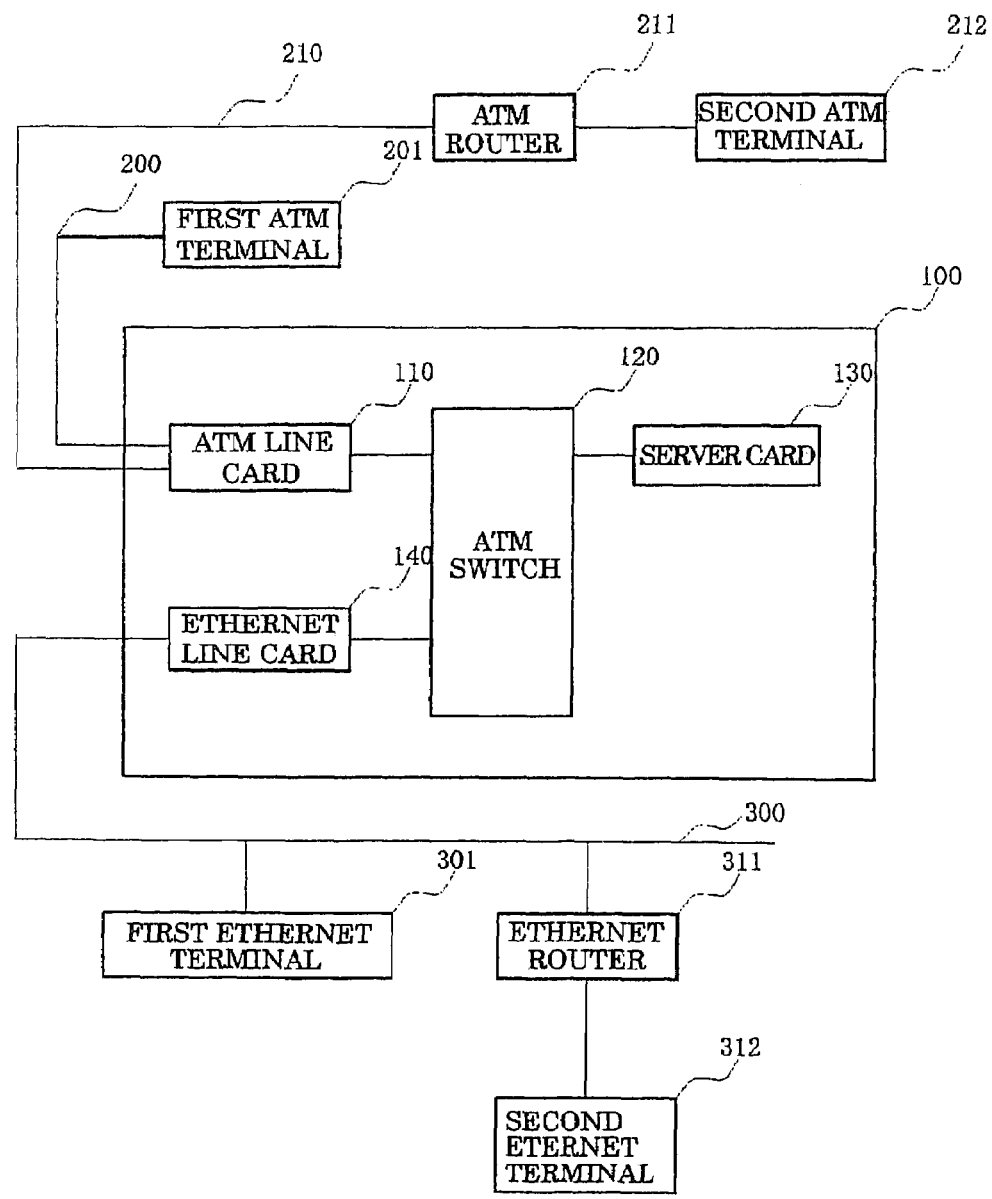
FIG. 5 is a block diagram of a communication system including the ATM exchange in accordance with the first embodiment.

FIG. 5 illustrates a communication system including the ATM exchange in accordance with the first embodiment.

Figure 6:
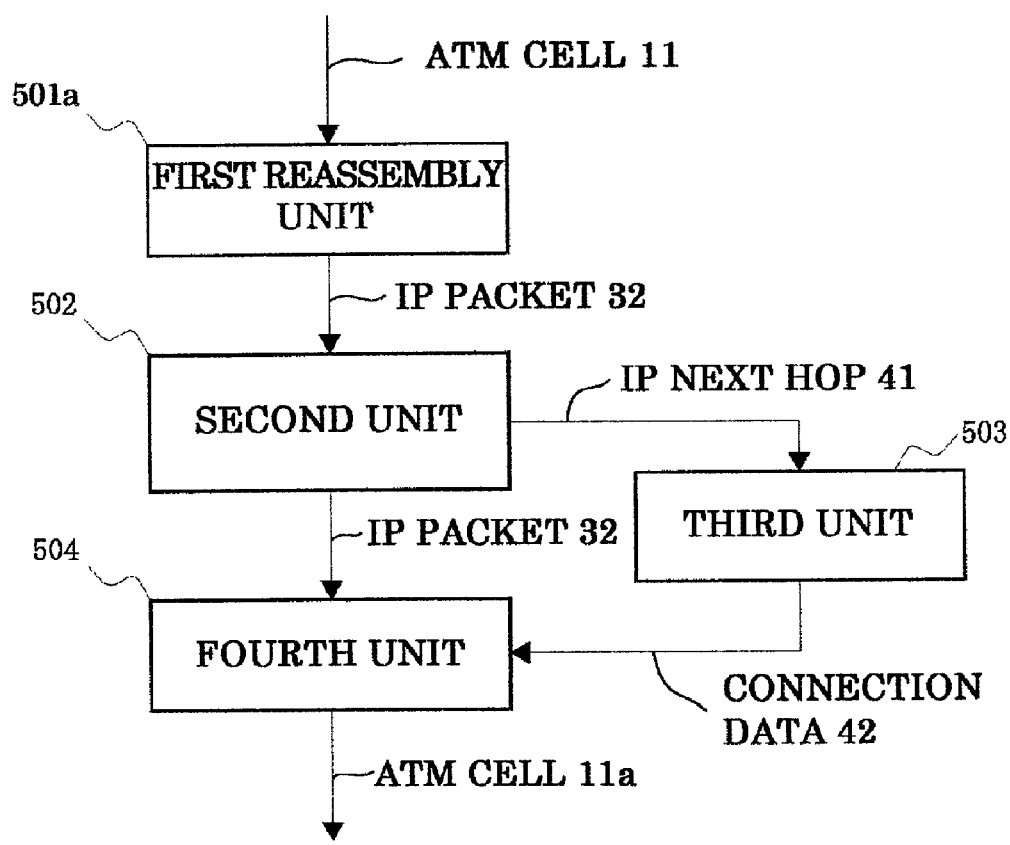
FIG. 6 is a block diagram of the server card in the ATM exchange in accordance with the first embodiment.

The communication system is comprised of an ATM exchange 100 including an ATM switch 120 exchanging the above-mentioned ATM cells 11, an ATM line card 110 connected to the ATM switch, a server card 130 connected to the ATM switch, and an Ethernet line card 140 connected to the ATM switch, a first ATM terminal 201 connected to the ATM line card 110 through an ATM line 200, an ATM router 211 connected to the ATM line card 110 through an ATM line 210, a second ATM terminal 212 connected to the ATM router 211, an Ethernet terminal 301 connected to the Ethernet line card 140 through an Ethernet line 300, an Ethernet router 311 connected to the Ethernet line card 140 through the Ethernet line 300, and an Ethernet terminal 312 connected to the Ethernet router FIG. 6 illustrates a structure of the server card 130.

The server card 130 is comprised of a first reassembly unit 501a, a second unit 502 for retrieving a routing table, a third unit 503 for producing connection data, and a fourth unit 504 for carrying out segmentation.

The first reassembly unit 501a receives an ATM cell 11, converts the thus received ATM cell 11 into an IP packet 32, and transmits the thus converted IP packet 32 to the second unit 502. The second unit 502 receives the IP packet 32 from the first unit 501, and extracts an IP next hop 41 out of the IP packet 32. The thus extracted IP packet 32 is transmitted to the third unit 503, and the IP packet 32 received by the second unit 502 is transmitted to the fourth unit 504.

The third unit 503 converts the thus received IP next hop 41 into connection data 42. The thus produced connection data 42 is transmitted to the fourth unit 504.

The fourth unit 504 converts the IP packet 32 into an output ATM cell 11a, based on the connection data 42 received from the third unit 503.

Figure 7:
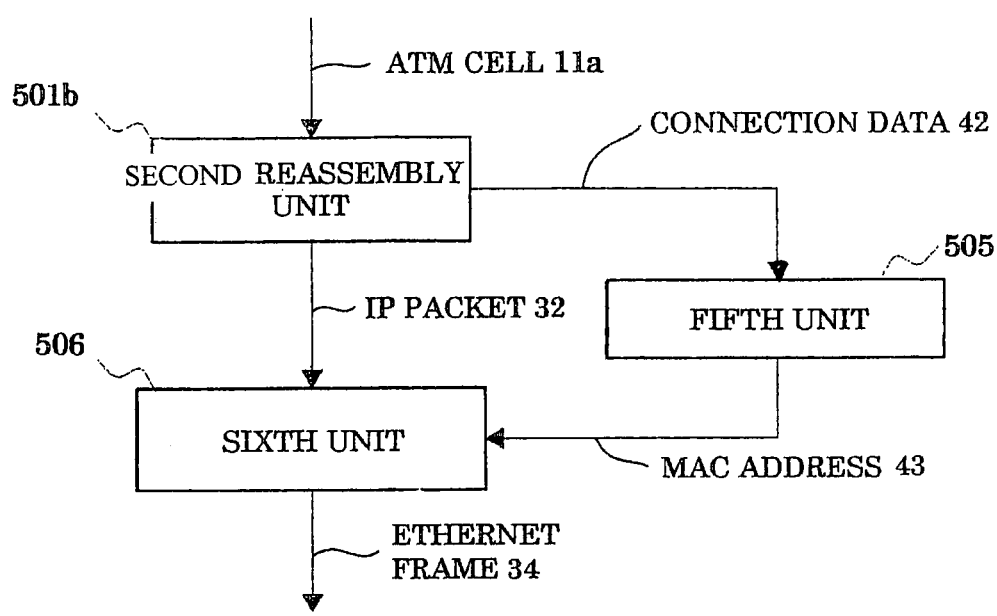
FIG. 7 is a block diagram of the Ethernet line card in the ATM exchange in accordance with the first embodiment.

FIG. 7 illustrates a structure of the Ethernet line card 140.

As illustrated in FIG. 7, the Ethernet line card 140 is comprised of a second reassembly unit 501b, a fifth unit 505 for producing a MAC address, and a sixth unit 506 for producing an Ethernet frame.

The second reassembly unit 505 receives the ATM cell 11a. Then, the second reassembly unit 505 converts the ATM cell 11a into an IP packet 32, and at the same time, extracts the connection data 42 out of the ATM cell 11a.

The fifth unit 505 receives the connection data 42 from the second reassembly unit 501b, and converts the connection data 42 into a MAC (Medium Access Control) address 43.

The sixth unit 506 receives the IP packet 32 from the second reassembly unit 501b and the MAC address 43 from the fifth unit 505, and converts the IP packet 32 into an Ethernet frame 34, based on the MAC address 43.

Both the ATM line card 110 and the ATM switch 120 are known to those skilled in the art, and hence, are not explained in detail.

The next hop information adder 7 illustrated in FIG. 4 corresponds to the server card 130, and the shared medium frame generator 8 illustrated in FIG. 4 corresponds to the Ethernet line card 140.

The ATM exchange in accordance with the first embodiment uses the IP packet 32 as the network layer packet 10, and Ethernet as the shared medium. However, it should be noted that other network layer packets such as IPX (Internetwork Packet eXchange) may be used in place of the IP packet 32, and other shared mediums such as a token ring may be used in place of the Ethernet.

Hereinbelow is explained an operation of the ATM exchange in accordance with the first embodiment.

Figure 8:
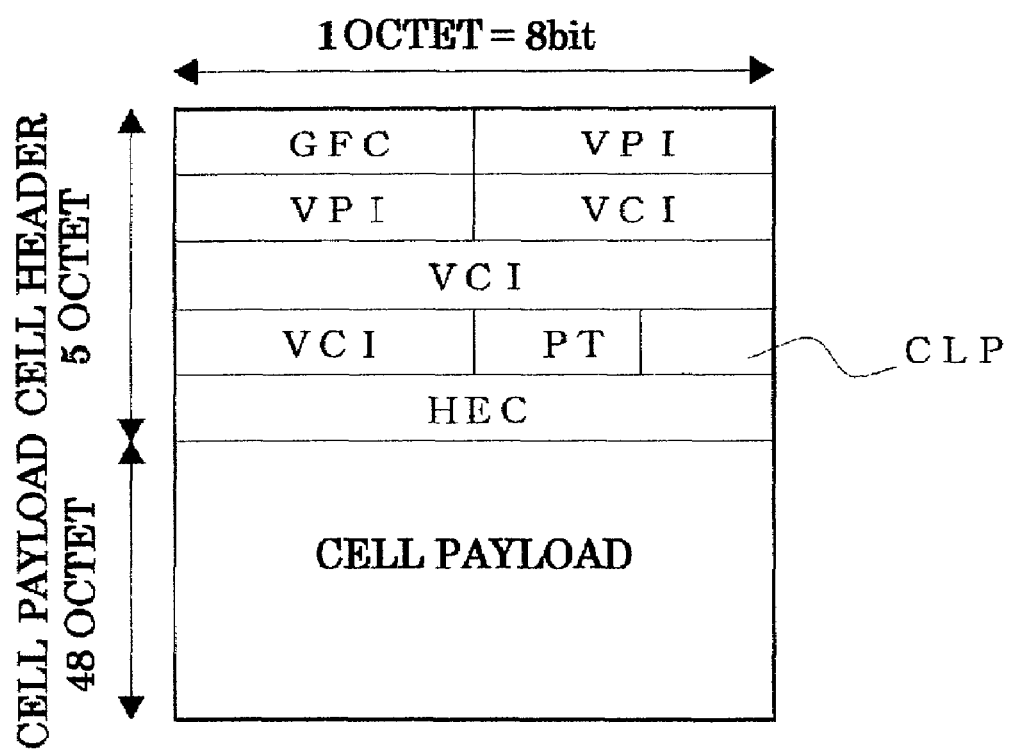
FIG. 8 illustrates a format of an ATM cell.
Figure 9:
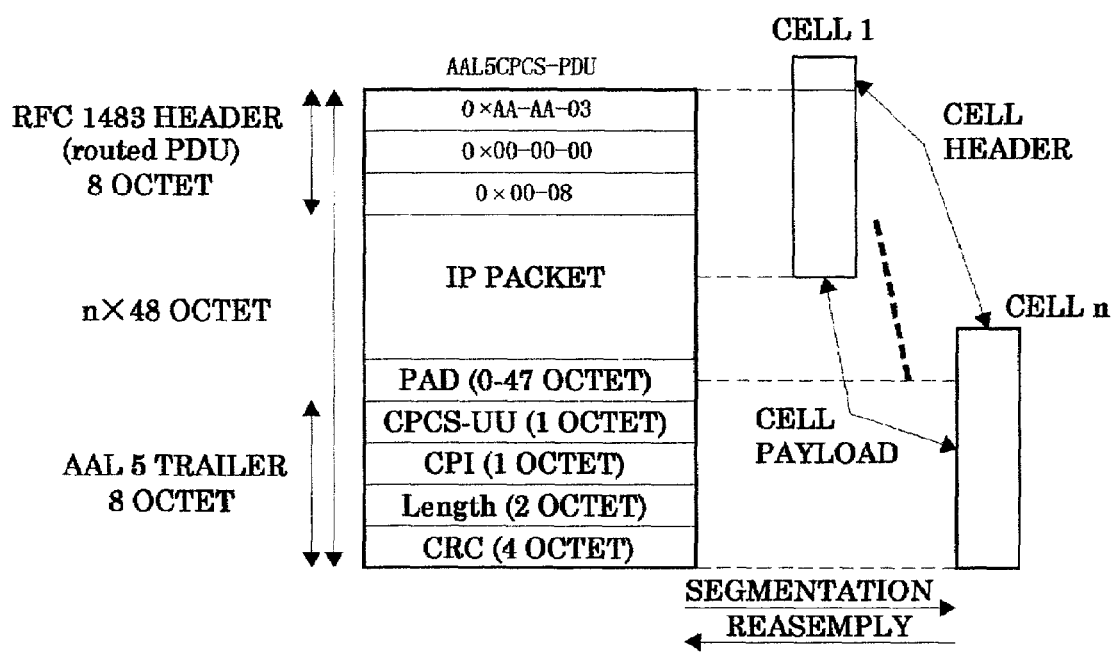
FIG. 9 illustrates steps of converting an IP packet to an ATM cell.

FIG. 8 illustrates a format of the ATM cell 11, and FIG. 9 illustrates the steps of transmitting the IP packet 32 through an ATM line.

In FIG. 8, VPI Virtual Path Identifier) and VCI (Virtual Channel Identifier) fields are used as the connection data.

The method illustrated in FIG. 9 is called LLC/SNAP encapsulation for routed PDU and defined in RFC 1483 published from IETF (Internet Engineering Task Force). Another method may be used in place of the method illustrated in FIG. 9.

Hereinbelow is explained segmentation.

As illustrated in FIG. 9, RFC 1483 header of 8 octets, PAD of 1 to 47 octets, and AAL5 trailer of 8 octets are added to an IP packet to thereby constitute AAL 5 CPCS-PDU. PAD is designed to have such a size that AAL 5 CPCS-PDU is equal to a multiple of 48 octets.

AAL 5 CPCS-PDU is divided into sections each having 48 octets, and each of the sections is accommodated into a cell payload illustrated in FIG. 8 to thereby constitute an ATM cell.

The operation as mentioned above is called segmentation. In segmentation, an ATM cell associated with a certain IP packet has the same connection data.

With reference to FIG. 5, an IP packet 32 which has been converted into an ATM cell 11 as the result of carrying out the above-mentioned segmentation is transmitted to the ATM exchange 100 from the first ATM terminal 201 and from the second ATM terminal 212 through the ATM router 211. The IP packet 32 or the ATM cell 11 is transmitted to the server card 130 through the ATM line card 110 and the ATM switch 120.

The ATM cell 11 is introduced into the first reassembly unit 501a, which carries out steps just inverse to the above-mentioned segmentation. That is, cell payloads of the ATM cells 11 having the same connection data 21 are coupled to each other, and resultingly, AAL 5 CPCS-PDU and the IP packet 32 are restored. This operation is called reassembly.

The second unit 502 retrieves the IP next hop 41 out of the thus restored IP packet 32. The IP next hop 41 means data used for determining a next IP address to which the IP packet 32 is to be transmitted, in order to enable the IP packet 32 to reach a destination IP address.

FIG. 10 illustrates an example of the routing table 601. Since the first ATM terminal 201 and the Ethernet 301 are connected directly to the ATM exchange 100, the IP addresses of them are described as IP next hops 41a and 41c of them.

The IP address of the ATM router 211 connected to both the second ATM terminal 212 and ATM exchange 100 is described as an IP next hop 41b, and the IP address of the Ethernet router 311 connected to both the Ethernet terminal 312 and ATM exchange 100 is described as an IP next hop 41d.

The IP next hop 41 extracted by the second unit 502 is converted into the connection data 42 by the third unit 503.

FIG. 11 illustrates a table 602 for converting the IP next hop into the connection data.

As illustrated in FIG. 11, connection data 42a, 42b, 42c and 42d are assigned to the first ATM terminal 201, the ATM router 211, the Ethernet terminal 301 and the Ethernet router 311, respectively.

The IP packet 32 is converted into the ATM cell 11a in the fourth unit 504 through the steps illustrated in FIGS. 8 and 9.

When the ATM cell 11a is addressed to the first ATM terminal 201, the IP packet 32 in the form of the ATM cell 11a output from the server card 130 is transmitted to the first ATM terminal 201 through the ATM switch 120, the ATM line card 110 and the ATM line 200 in accordance with the connection data 42a. In this step, since an operation just inverse to the operation for transmitting the IP packet 32 in the form of the ATM cell to the server card 130 from the first ATM terminal 201 is carried out, the first ATM terminal 201 could readily receive the ATM cell 11a, and convert the ATM cell 11a into the IP packet 32.

When the ATM cell 11a is addressed to the second ATM terminal 212, the IP packet 32 in the form of the ATM cell 11a output from the server card 130 is transmitted to the second ATM terminal 212 through the ATM switch 120, the ATM line card 110, the ATM line 210 and the ATM router 211 in accordance with the connection data 42b. In this step, since an operation just inverse to the operation for transmitting the IP packet 32 in the form of the ATM cell to the server card 130 from the second ATM terminal 212 is carried out, the second ATM terminal 212 could readily receive the ATM cell 11a, and convert the ATM cell 11a into the IP packet 32.

When the ATM cell 11a is addressed to a terminal having an address in the Ethernet, it is necessary for the ATM cell 11a to have a MAC address as well as an IP address in order to make communication in the Ethernet.

In ATM communication, it is not necessary for an ATM cell to have data corresponding to a MAC address, because one-to-one communication can be accomplished. To the contrary, in a shared medium such as Ethernet, since a shared medium frame is received by all network equipments connected to the shared medium, it would be necessary to distinct the network equipments from one another by a MAC address.

Figure 12:
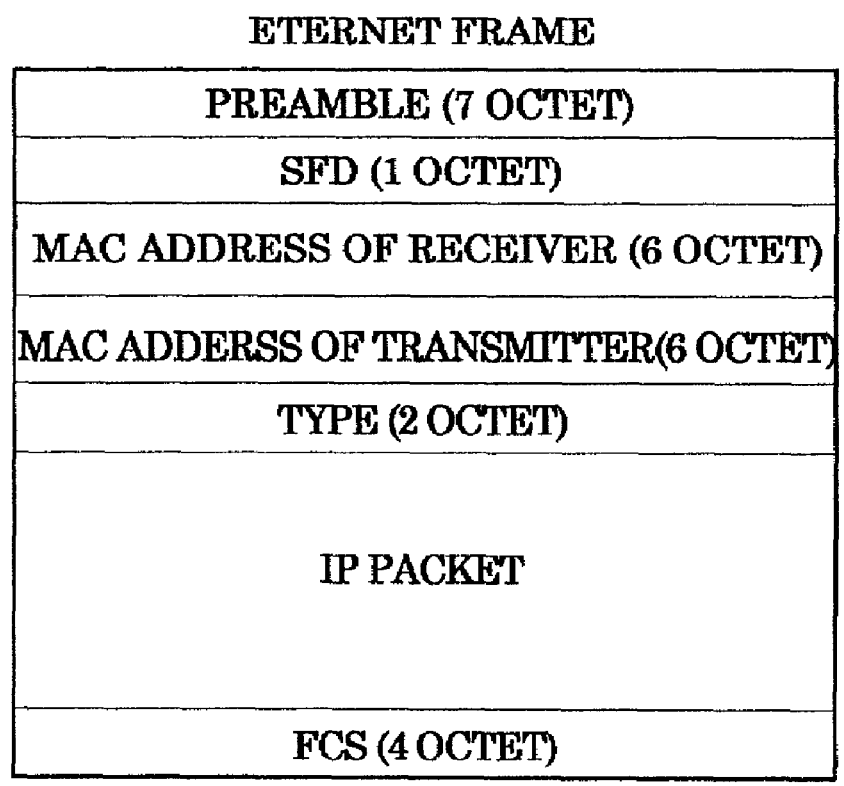
FIG. 12 illustrates an Ethernet frame in the first embodiment.

FIG. 12 illustrates an example of an Ethernet frame.

When the ATM cell 11a is addressed to the first Ethernet terminal 301, the IP packet 32 in the form of the ATM cell 11a output from the server card 130 is transmitted to the Ethernet line card 140 through the ATM switch 120 in accordance with the connection data 42c.

In the Ethernet line card 140, the second reassembly unit 501b converts the ATM cell 11a into the IP packet 32, and at the same time, extracts the connection data 42c out of the ATM cell 11a. The thus extracted connection data 42c is converted into a MAC address 43c in the fifth unit 505.

Figure 13:
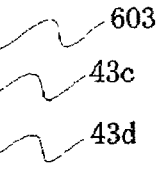
FIG. 13 illustrates a table in accordance with which connection data is converted into a MAC address in the first embodiment.

FIG. 13 illustrates a table 603 used for converting connection data into an associated MAC address.

As illustrated in FIG. 13, the connection data 42c is to be converted into the MAC address 43c of the Ethernet terminal 301, and later mentioned connection data 42d is to be converted into a MAC address 43d of the Ethernet router 311.

The sixth unit 506 converts the IP packet 32 into the Ethernet frame 34, based on the MAC address 43c of the first Ethernet terminal 301 obtained in accordance with the table 603. The thus produced Ethernet frame 34 is transmitted to the first Ethernet terminal 301 through the Ethernet line 300.

When the ATM cell 11a is addressed to the second Ethernet terminal 312, the IP packet 32 in the form of the ATM cell 11a output from the server card 130 is transmitted to the Ethernet line card 140 through the ATM switch 120 in accordance with the connection data 42d.

In the Ethernet line card 140, the second reassembly unit 501b converts the ATM cell 11a into the IP packet 32, and at the same time, extracts the connection data 42d out of the ATM cell 11a. The thus extracted connection data 42c is converted into a MAC address 43d, that is, a MAC address of the Ethernet router 311 in the fifth unit 505.

The sixth unit 506 converts the IP packet 32 into the Ethernet frame 34, based on the MAC address 43d. The thus produced Ethernet frame 34 is transmitted to the second Ethernet terminal 312 through the Ethernet line 300 and the Ethernet router 311.

[Second Embodiment]

As explained in detail hereinbelow, the ATM exchange in accordance with the second embodiment is structurally different from the ATM exchange in accordance with the first embodiment in that the table 602 to be used in the third unit 503 and the table 603 to be used in the fifth unit 505 are not in advance prepared, but instead, ARP (Address Resolution Protocol) is used.

FIG. 14 is a flow chart showing an operation of the ATM exchange in accordance with the second embodiment.

When the third unit 503 receives an IP packet 32x including a unregistered IP next hop 41x in step 101, the third unit 503 checks whether the table 602 includes connection data associated with the received IP next hop 41x, in step 102.

When the third unit 503 finds connection data 42x associated with the received IP next hop 41x in the table 602 in step 103 (YES in step 102), the third unit 503 transmits the connection data 42x to the fourth unit 504, in step 104.

When the third unit 503 cannot find connection data 42x associated with the received IP next hop 41x in the table 602 (NO in step 102), the third unit 503 transmits an ATM ARP packet associated with the IP next hop 41x, to the fifth unit 505 in step 105.

Then, the third unit 503 waits a later mentioned ATM ARP response to be transmitted from the fifth unit 505, in step 106.

On receipt of the ATM ARP response including the connection data 42x, from the fifth unit 505, the third unit 503 stores a relation between the IP next hop 41x and the connection data 42x into the table 602, in step 107.

When the fifth unit 505 receives the ATM ARP packet transmitted from the third unit 503 in step 105, in step 108, non-used connection data 42x is assigned to the ATM ARP packet in step 109.

On receipt of the ATM ARP packet, the fifth unit 505 transmits an ARP packet associated with the IP next hop 41x, to the Ethernet 300, in step 110'.

Then, the fifth unit 505 waits for a response to the ARP packet, in step 111.

When the fifth unit 505 receives a response to the ARP packet, the fifth unit 505 extracts the MAC address 43x out of the response, in step 112.

Then, the fifth unit 505 stores a relation between the non-used connection data 42x and the MAC address 43x into the table 603, and at the same time, transmits the connection data 42x as the ATM ARP response to the third unit 503, in step 113. As mentioned earlier, on receipt of the ATM ARP response or the connection data 42x, the third unit 503 stores a relation between the IP next hop 41x and the connection data 42x into the table 602, in step 107.

Then, the fifth unit 505 transmits the MAC address 43x to the sixth unit 506, in step 114.

When the fifth unit 505 receives the connection data 42x in step 115, the fifth unit 505 retrieves the table 603 to thereby find the MAC address 43x associated with the connection data 42x, in step 116.

Then, the fifth unit 505 transmits the MAC address 43x to the sixth unit 506, in step 117.

In the second embodiment, a relation between the IP next hop 41 and the connection data 42 and a relation between the connection data 24 and the MAC address 43 are defined in accordance with ARP protocol. Accordingly, the ATM exchange in accordance with the second embodiment could have flexibility in modifying a structure of the network, for instance, when a terminal has to be increased in number.

In the above-mentioned second embodiment, ATM ARP is used in communication between the third unit 503 and the fifth unit 505. ATM ARP is an internal protocol. In place of ATM ARP, there may be used any protocol including non-standard protocol, if the protocol is suitable for an operation of the ATM exchange in accordance with the present invention.

[Third Embodiment]

Figure 15:
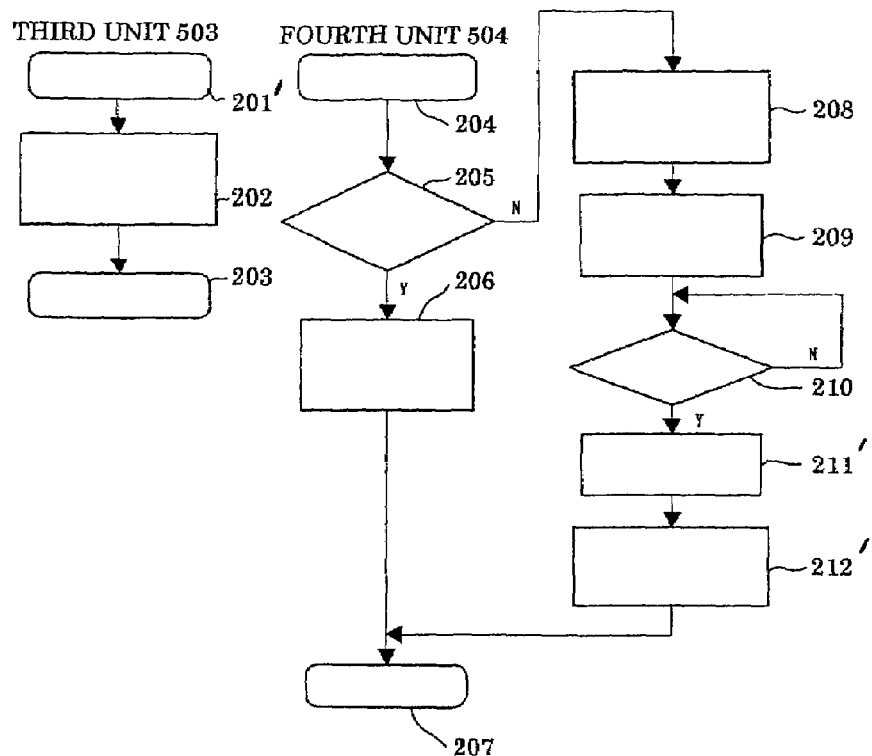
FIG. 15 is a flow chart showing steps to be carried out in the ATM exchange in accordance with the third embodiment.

FIG. 15 is a flow chart showing an operation of the ATM exchange in accordance with the third embodiment.

With reference to FIG. 15, the third unit 503 receives an IP packet 32y including an IP next hop 41y, in step 201'.

Then, the third unit 503 produces connection data 42y in accordance with a predetermined rule, in step 202.

Then, the third unit 503 transmits the IP packet 32y and the connection data 42y to the fifth unit 505, in step 203.

On receipt of the IP packet 32y and the connection data 42y in step 204, the fifth unit 505 checks whether the connection data 42y is registered in the table 603, in step 205.

When the connection data 42y is registered in the table 603 (YES in step 205), the fifth unit 505 retrieves the table 603 to find a MAC address 43y associated with the connection data 42y, in step 206.

Then the fifth unit 505 transmits the MAC address 43y to the sixth unit 506, in step 207.

When the connection data 42y is not registered in the table 603 (NO in step 205), the fifth unit 505 defines the IP next hop 41y in accordance with a predetermined rule, based on the connection data 42y, in step 208.

Then, the fifth unit 505 transmits an ARP packet associated with the IP next hop 41y, onto the Ethernet 300, in step 209.

Then, the fifth unit 505 waits for a responsive ARP packet, in step 210'.

When the fifth unit 505 receives a responsive ARP packet, the fifth unit 505 extracts the MAC address 43y out of the responsive ARP packet, in step 211'. 505 extracts the MAC address 43y out of the responsive ARP packet, in step 211.

Then, the fifth unit 505 stores a relation between the connection data 42y and the MAC address 43y into the table 603, in step 212'.

Then, the fifth unit 505 transmits the MAC address 43y to the sixth unit 506, in step 207.

The above-mentioned predetermined rule may be determined as a rule that lowermost 8 bits in VCI field are set equal to lowermost 8 bits in the IP next hop 41y in the connection data 42y, for instance.

The fifth unit 505 could restore the IP next hop 41y by coupling a network address of 24 bits assigned to the Ethernet line 300, to lowermost 8 bits in VCI field in the connection data 42y.

In accordance with the above-mentioned third embodiment, since a relation between the IP next hop 41x and the connection data 42x is defined in accordance with a predetermined rule without using ATM ARP, the third embodiment provides the same advantages as the advantages provided by the first and second embodiments.

In addition, the third embodiment provides an addition advantage of reduction in communication and steps to be carried out. Furthermore, the third unit 503 is not necessary to include the table 602.

[Fourth Embodiment]

Figure 16:
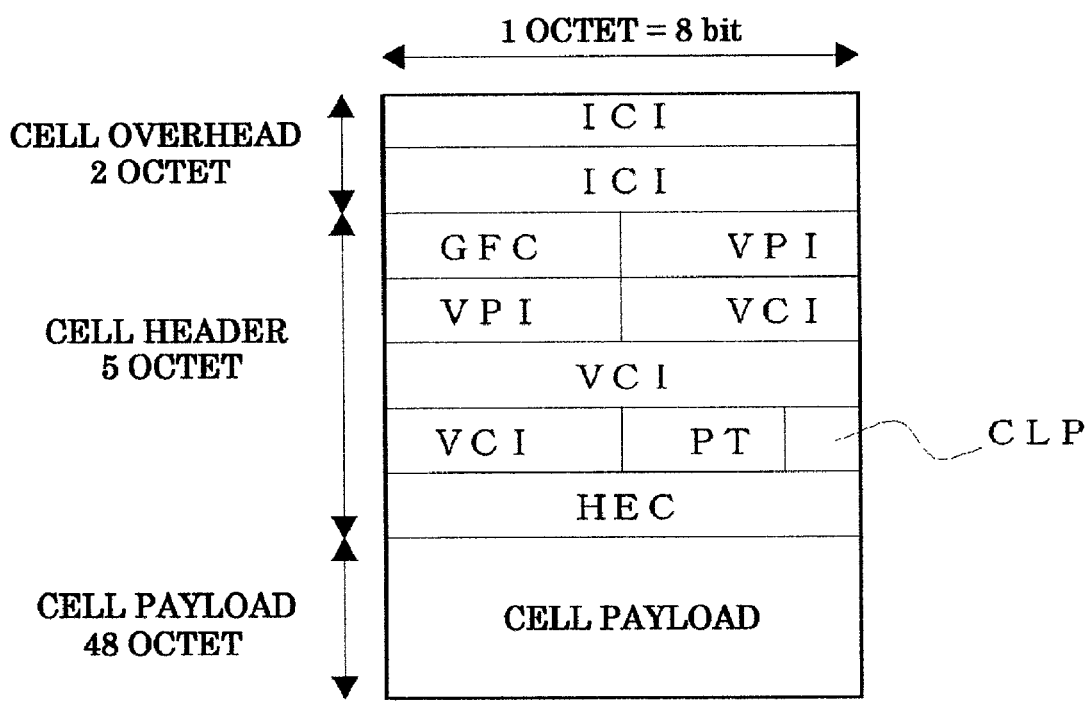
FIG. 16 illustrates a cell format used in the ATM exchange in accordance with the fourth embodiment.

In the fourth embodiment, when an ATM exchange is to be carried out in the ATM switch 120, there is used an internal connection identification (ICI) as connection data. The internal connection identification (ICI) is used only in the ATM exchange 100. FIG. 16 illustrates an example of a cell format in which the internal connection identification is used.

In the fourth embodiment, there is always used the same ICI in communication between the third unit 503 and the fifth unit 505, and VPI field may be used for the purpose of notifying the connection data 42.

The internal connection identification (ICI) is just an example of an internal connection identifier used only in the ATM exchange when an ATM cell is exchanged.

Since the same internal connection identification (ICI) is always used in communication between the third unit 503 and the fifth unit 505 in the fourth embodiment, a table used for switching the ATM cells 11 in the ATM switch 120 can be made smaller, ensuring reduction in ATM cell exchange.

Though an ICI field is used for exchanging ATM cells in the ATM switch 120 and a VPI field is used as the connection data 42 in the fourth embodiment, a VPI field may be used as the connection data 42 and a VCI field may be used for exchanging ATM cells. Other combinations of fields may be selected.

The ATM exchange having been mentioned so far may be accomplished as a program including various commands, and be presented through a recording medium readable by a computer.

Figure 17:
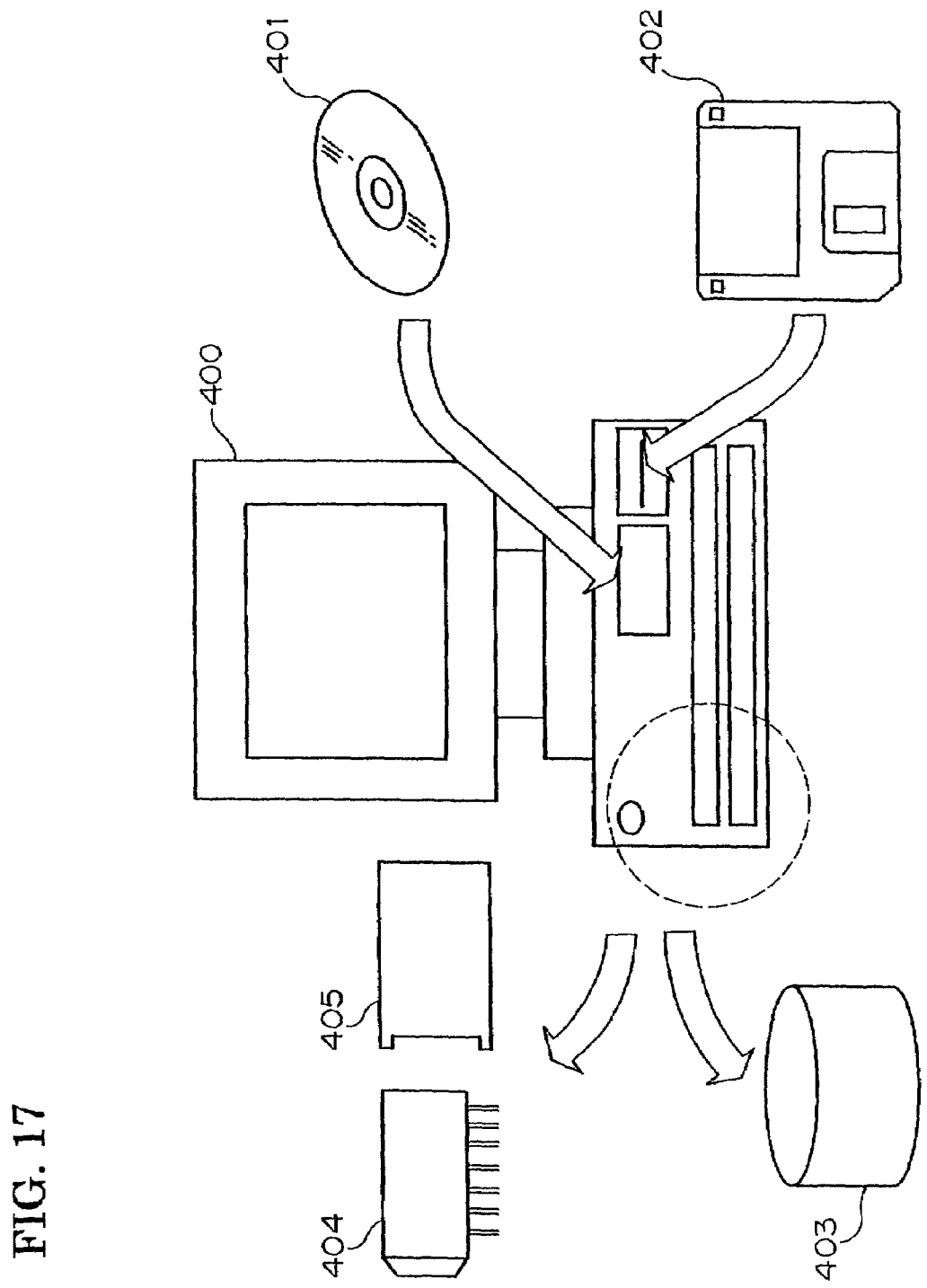
FIG. 17 illustrates examples of recording mediums in which a program for operating the ATM exchange is to be stored.

In the specification, the term "recording medium" means any medium which can record data therein. Examples of a recording medium are illustrated in FIG. 17.

The term "recording medium" includes, for instance, a disk-shaped recorder 401 such as CD-ROM (Compact Disk-ROM) or PD, a magnetic tape, MO (Magneto Optical Disk), DVD-ROM (Digital Video Disk-Read Only Memory), DVD-RAM (Digital Video Disk-Random Access Memory), a floppy disk 402, a memory chip 404 such as RAM (Random Access Memory) or ROM (Read Only Memory), EPROM (Erasable Programmable Read Only Memory), EEPROM (Electrically Erasable Programmable Read Only Memory), smart media (Registered Trade Mark), a flush memory, a rewritable card-type ROM 405 such as a compact flush card, a hard disk 403, and any other suitable means for storing a program therein.

A recording medium storing a program for accomplishing the above-mentioned apparatus may be accomplished by programming functions of the above-mentioned apparatuses with a programming language readable by a computer, and recording the program in a recording medium such as mentioned above.

A hard disc equipped in a server may be employed as a recording medium. It is also possible to accomplish the recording medium in accordance with the present invention by storing the above-mentioned computer program in such a recording medium as mentioned above, and reading the computer program by other computers through a network.

As a computer 400, there may be used a personal computer, a desk-top type computer, a note-book type computer, a mobile computer, a lap-top type computer, a pocket computer, a server computer, a client computer, a workstation, a host computer, a commercially available computer, and electronic exchanger, for instance.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-17587 filed on Jan. 26, 2000 including specification, claims, drawings and summary is incorporated herein by reference in its entirety.

What is claimed is:

1. An asynchronous transfer mode (ATM) exchange, comprising:
   an ATM switch;
   (a) a next hop information adder; and
   (b) a shared medium frame generator, separate from and connected to said next hop information adder by said ATM switch,
   said next hop information adder including:
   (a1) a first unit which converts an ATM cell including connection data, into a network layer packet;
   (a2) a second unit which extracts a network layer next hop out of said network layer packet;
   (a3) a third unit which converts said network layer next hop into associated connection data; and
   (a4) a fourth unit which receives said network layer packet from said second unit and said connection data from said third unit, and converts the thus received network layer packet and connection data into a first ATM cell and transmits said first ATM cell to said ATM switch,
   said shared medium frame generator including:
   (b1) a fifth unit that receives said first ATM cell from said ATM switch which converts said first ATM cell into a network layer packet and extracts said connection data out of said first ATM cell;
   (b2) a sixth unit which receives said connection data from said fifth unit and converts the thus received connection data into a shared medium address; and
   (b3) a seventh unit which receives said network layer packet from said fifth unit and said shared medium address from said sixth unit, and converts the thus received network layer packet and shared medium address into a shared medium frame.

2. The asynchronous transfer mode (ATM) exchange as set forth in claim 1, wherein a relation between said network layer next hop and said connection data is defined by address resolution protocol (ARP).

3. The asynchronous transfer mode (ATM) exchange as set forth in claim 1, wherein a relation between said connection data and said shared medium address is defined by address resolution protocol (ARP).

4. The asynchronous transfer mode (ATM) exchange as set forth in claim 1, wherein said third unit converts said network layer next hop said associated connection data in accordance with a predetermined rule.

5. The asynchronous transfer mode (ATM) exchange as set forth in claim 1, wherein a communication between said third unit and said sixth unit is made through an internal connection identifier.

6. An asynchronous transfer mode (ATM) exchange comprising:
   (a) an asynchronous transfer mode (ATM) switch;
   (b) a server card receiving an ATM cell including connection data, from said asynchronous transfer (ATM) mode switch;
   (c) an Ethernet line card, separate from and connected to said server card through said ATM switch, said Ethernet line card receiving an ATM cell including connection data, from said asynchronous transfer (ATM) mode switch, and connecting to an Ethernet terminal directly or through an Ethernet router; and
   (d) an asynchronous transfer mode line card receiving an ATM cell from said asynchronous transfer (ATM) mode switch, and connecting to an asynchronous transfer mode terminal directly or through an asynchronous transfer mode router,
   said server card including:
   (b1) a first unit which converts said ATM cell received from said ATM switch into a network layer packet;
   (b2) a second unit which extracts a network layer next hop out of said network layer packet;
   (b3) a third unit which converts said network layer next hop into associated connection data; and
   (b4) a fourth unit which receives said network layer packet from said second unit and said connection data from said third unit, and converts the thus received network layer packet and connection data into a first ATM cell and transmits said first ATM cell to said ATM switch,
   said Ethernet line card including:
   (c1) a fifth unit which converts said first ATM cell received from said ATM switch into a network layer packet and extracts said connection data out of said first ATM cell;
   (c2) a sixth unit which receives said connection data from said fifth unit and converts the thus received connection data into a shared medium address, and
   (c3) a seventh unit which receives said network layer packet from said fifth unit and said shared medium address from said sixth unit, and converts the thus received network layer packet and shared medium address into a shared medium frame.

7. The asynchronous transfer mode (ATM) exchange as set forth in claim 6, wherein a relation between said network layer next hop and said connection data is defined by address resolution protocol (ARP).

8. The asynchronous transfer mode (ATM) exchange as set forth in claim 6, wherein a relation between said connection data and said shared medium address is defined by address resolution protocol (ARP).

9. The asynchronous transfer mode (ATM) exchange as set forth in claim 6, wherein said third unit converts said network layer next hop said associated connection data in accordance with a predetermined rule.

10. The asynchronous transfer mode (ATM) exchange as set forth in claim 6, wherein a communication between said third unit and said sixth unit is made through an internal connection identifier.

11. A method of operating an asynchronous transfer mode (ATM) exchange, comprising the steps of:
    (a) converting an ATM cell including connection data, into a network layer packet;
    (b) extracting a network layer next hop out of said network layer packet;
    (c) converting said network layer next hop into associated connection data;
    (d) converting said network layer packet and said associated connection data into a first ATM cell, (e) transferring said first ATM cell through an ATM switch;
(f) converting said first ATM cell into a network layer packet;
(g) extracting connection data out of said first ATM cell;
(h) converting said connection data into a shared medium address,
(i) converting said network layer packet and said shared medium address into a shared medium frame,
said steps (a) to (d) being to be carried out independently of said steps (f) to (i), and
identifying a relation between said network layer next hop and said connection data by address resolution protocol (ARP).

12. The method as set forth in claim 11, wherein said steps (f) and (g) are concurrently carried out.

13. The method as set forth in claim 11, further comprising the step of identifying a relation between said connection data and said shared medium address by address resolution protocol (ARP).

14. The method as set forth in claim 11, wherein said step (c) is carried out in accordance with a predetermined rule.

15. A recording medium readable by a computer, storing a program therein for causing a computer to carry out a method of operating an asynchronous transfer mode (ATM) exchange, said method comprising the steps of:
(a) converting an ATM cell including connection data, into a network layer packet;
(b) extracting a network layer next hop out of said network layer packet;
(c) converting said network layer next hop into associated connection data;
(d) converting said network layer packet and said associated connection data into a first ATM cell,
(e) transferring said first ATM cell through an ATM switch;
(f) converting said first ATM cell into a network layer packet;
(g) extracting connection data out of said first ATM cell;
(h) converting said connection data into a shared medium address,
(i) converting said network layer packet and said shared medium address into a shared medium frame,
said steps (a) to (d) being to be carried out independently of said steps (f) to (i), and
identifying a relation between said network layer next hop and said connection data by address resolution protocol (ARP).

16. The recording medium as set forth in claim 15, wherein said steps (f) and (g) are concurrently carried out.

17. The recording medium as set forth in claim 15, wherein said method further includes the step of identifying a relation between said connection data and said shared medium address by address resolution protocol (ARP).

18. The recording medium as set forth in claim 15, wherein said step (c) is carried out in accordance with a predetermined rule.

* * * * *